United States Patent [19]

Yamaguchi et al.

[11] Patent Number: 5,761,211
[45] Date of Patent: Jun. 2, 1998

[54] PEAK CORRELATION TIMING RECOVERY CIRCUIT AND RECEIVING APPARATUS

[75] Inventors: Norio Yamaguchi; Haruhiro Shiino; Ryoichi Miyamoto, all of Minato-ku, Japan

[73] Assignee: OKI Electric Industry Co., Ltd., Tokyo, Japan

[21] Appl. No.: 689,021

[22] Filed: Jul. 30, 1996

[30] Foreign Application Priority Data

Aug. 25, 1995  [JP]  Japan .................. 7-216993

[51] Int. Cl.[6] .................................. G06F 11/00
[52] U.S. Cl. .................. 371/5.4; 371/5.1; 371/47.1; 375/224; 375/226; 375/371
[58] Field of Search .................. 371/5.1, 1, 2.1, 371/5.4, 47.1, 48, 67.1; 375/354, 371, 220, 224

[56] References Cited

U.S. PATENT DOCUMENTS

| | | | |
|---|---|---|---|
| 5,426,671 | 6/1995 | Bergmans | 375/354 |
| 5,594,758 | 1/1997 | Petranovich | 375/344 |
| 5,602,881 | 2/1997 | Shiino et al. | 375/371 |
| 5,610,949 | 3/1997 | Petranovich | 375/330 |

*Primary Examiner*—Phung M. Chung
*Attorney, Agent, or Firm*—Spencer & Frank

[57] ABSTRACT

A timing recovery circuit samples an input signal, correlates the resulting sample stream with a reference pattern at different timings, then compares the resulting correlation values with each other and with a threshold, and estimates a timing at which a peak correlation can be obtained. The peak correlation timing is estimated with a precision exceeding the precision given by the sampling period. The estimated timing can be used by a receiving circuit for bit synchronization, symbol synchronization, or frame synchronization, or to adjust the sampling timing.

19 Claims, 5 Drawing Sheets

PEAK CORRELATION TIMING RECOVERY CIRCUIT AND RECEIVING APPARATUS

BACKGROUND OF THE INVENTION

The present invention relates to a timing recovery circuit for estimating a peak correlation timing, and to receiving apparatus using this timing recovery circuit for a synchronization function such as bit, symbol, or frame synchronization.

Frame synchronization, for example, is conventionally performed by correlating a known reference pattern with an input signal at different timings, and selecting the timing that produces the maximum correlation. The correlation process is carried out digitally, so the input signal is first converted from analog form to a stream of digital sample values. The selected maximum correlation timing is one of the sample timings.

A problem is that the precision of timing recovery or synchronization is then limited by the sampling rate. To achieve high precision, it becomes necessary to use a high-speed analog-to-digital (A/D) converter. Such an A/D converter is expensive, consumes much power, and dissipates much heat. Accommodating a high-speed A/D converter within the design constraints of a receiving circuit can be a difficult or impossible task.

SUMMARY OF THE INVENTION

It is accordingly an object of the present invention to improve the precision of timing recovery without requiring a higher sampling rate.

The invented timing recovery circuit has a sampling means that samples an input signal to generate a sample stream, and a correlating means that correlates a reference pattern with the sample stream at different timings, thus generating a plurality of correlation values. A comparing and estimating means finds a maximum value among the correlation values generated during a certain search range, compares at least two other correlation values with a threshold, and estimates a timing at which a peak correlation value can be obtained. The comparison results are used to refine the precision of the estimate, so that the estimated timing can vary in minimum steps shorter than the interval between samples.

The estimated timing can be used in a receiving apparatus for various types of synchronization, such as bit synchronization, symbol synchronization, and frame synchronization. The receiving apparatus preferably has a control means adapted to adjust the sampling means so that the input signal is sampled at the timing estimated by the comparing and estimating means.

DETAILED DESCRIPTION OF THE INVENTION

Embodiments of the invention will be described with reference to the attached illustrative drawings, following a description of one example of an input signal to which the invention can be usefully applied.

Figure 1:
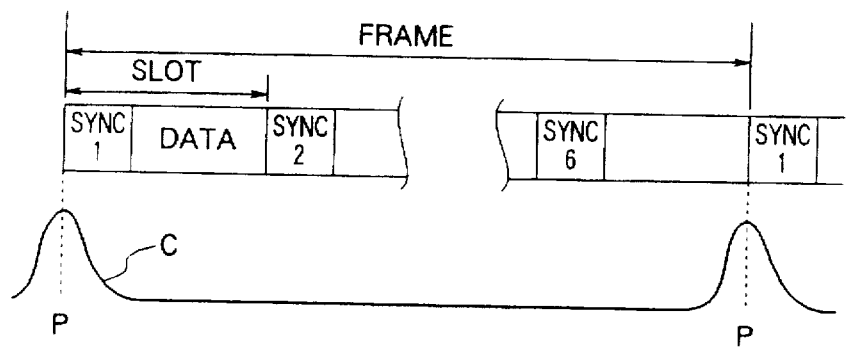
FIG. 1 illustrates an input signal having synchronization patterns, and shows correlations produced between a reference pattern and this input signal at different timings.

This signal, illustrated in FIG. 1, is a time-division multiple-access (TDMA) signal of the type employed in the North American digital cellular system. The signal is organized into frames of six time slots each, each slot comprising a synchronization pattern (SYNC) and data. There are six different synchronization patterns, designated in the drawing by numbers from one to six. Each synchronization pattern is designed to have a sharply-peaked autocorrelation function, and to have no significant correlation with the other synchronization patterns.

Examples of binary synchronization patterns with these correlation characteristics include maximum-length pseudo-random noise (PN) sequences, non-maximum-length PN sequences, Gold sequences, and Kasami sequences (the small set). Good correlation properties can also be obtained from m-ary sequences, where m is greater than two, and from combinations of the above.

If a reference pattern matching the first synchronization pattern (SYNC 1) is correlated with this signal at different timings, the resulting correlation values will generally vary as illustrated by curve C at the bottom of FIG. 1. The peak correlation timing P, also referred to as the Nyquist point, can be used for frame synchronization, and for synchronization of bits and symbols within the frame. (A symbol is a group of bits.) Timing recovery is a generic term for these different forms of synchronization.

Figure 2:
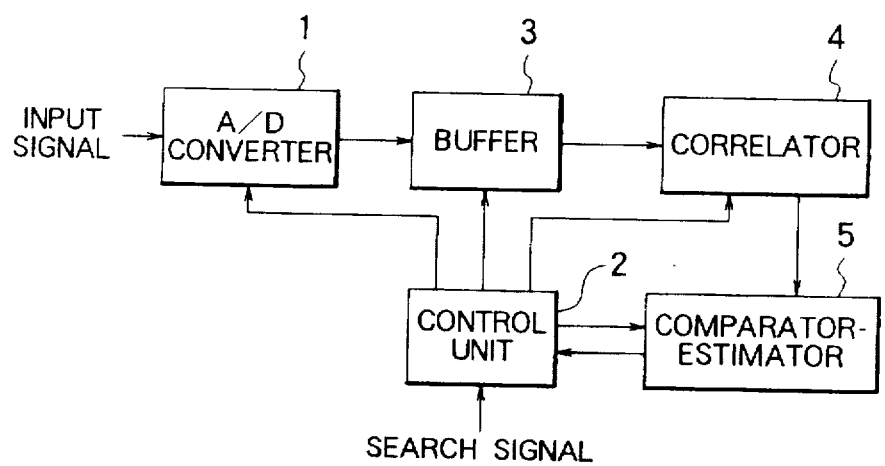
FIG. 2 is a block diagram of an embodiment of the invented timing recovery circuit.

FIG. 2 illustrates a timing recovery circuit embodying the present invention. The embodiment comprises an A/D converter 1, a control unit 2, a buffer 3, a correlator 4, and a comparator-estimator 5.

The A/D converter 1 receives an input signal, samples the input signal at sample timings separated by intervals of a certain length $\Delta t$, and converts the samples from analog to digital values, thereby generating a stream of sample values. The length $\Delta t$ of the interval between samples is referred to as the sampling period; its reciprocal $1/\Delta t$ is the sampling rate. The sample values may be either real or complex values, depending on how the input signal was modulated.

The control unit 2 receives a search signal, supplies the A/D converter 1 with a sampling clock having a frequency equal to the sampling rate, and supplies other clock and control signals to the buffer 3, correlator 4, and comparator-estimator 5. The control unit 2 also supplies a reference pattern to the correlator 4.

The buffer 3 stores a certain number of samples in the sample stream output by the A/D converter 1, so that they can be processed by the correlator 4.

The correlator 4 correlates the reference pattern supplied by the control unit 2 with an equivalent number of samples stored in the buffer 3. Correlations are performed at different timings, yielding different correlation values.

The comparator-estimator 5 compares the correlation values produced by the correlator 4 at timings in a certain search range, and estimates the timing P at which a peak correlation value can be obtained. The estimated peak timing P may be identical to one of the sample timings, or intermediate between two sample timings. The precision of P thus exceeds the length Δt of the interval between samples.

The precision of the peak timing P refers to the smallest unit of time by which the estimated value of P can vary. To say that the precision exceeds Δt means that P can be estimated in minimum steps smaller than Δt.

Figure 3:
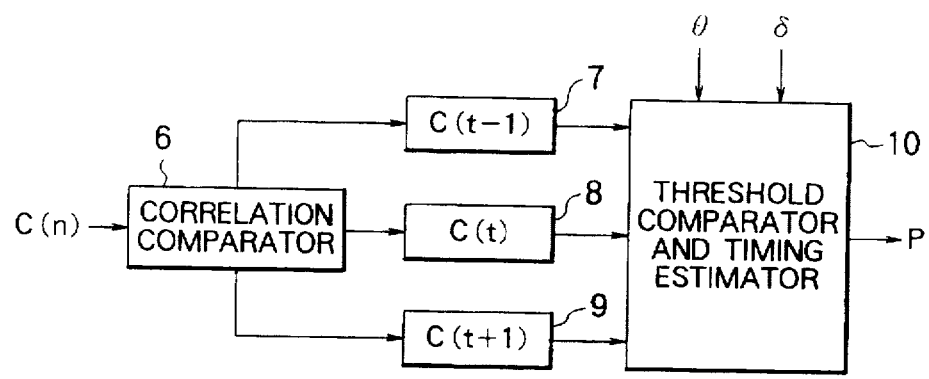
FIG. 3 is a block diagram of the comparator-estimator in FIG. 2.

FIG. 3 shows an example of the internal structure of the comparator-estimator 5. The structure comprises a correlation comparator 6, three registers 7, 8, and 9, and a threshold comparator and timing estimator 10. The correlation comparator 6 receives correlation values C(n) from the correlator 4, and stores three selected correlation values C(t−1), C(t), and C(t+1) in registers 7, 8, and 9. The threshold comparator and timing estimator 10 performs further comparisons involving these three correlation values, a magnitude threshold θ, and a difference threshold δ, and outputs the estimated peak timing P.

Next, the operation of this embodiment will be described with reference to FIGS. 4 to 10. The sample values output by the A/D converter 1 will be denoted y(1), y(2), . . .

Figure 4:
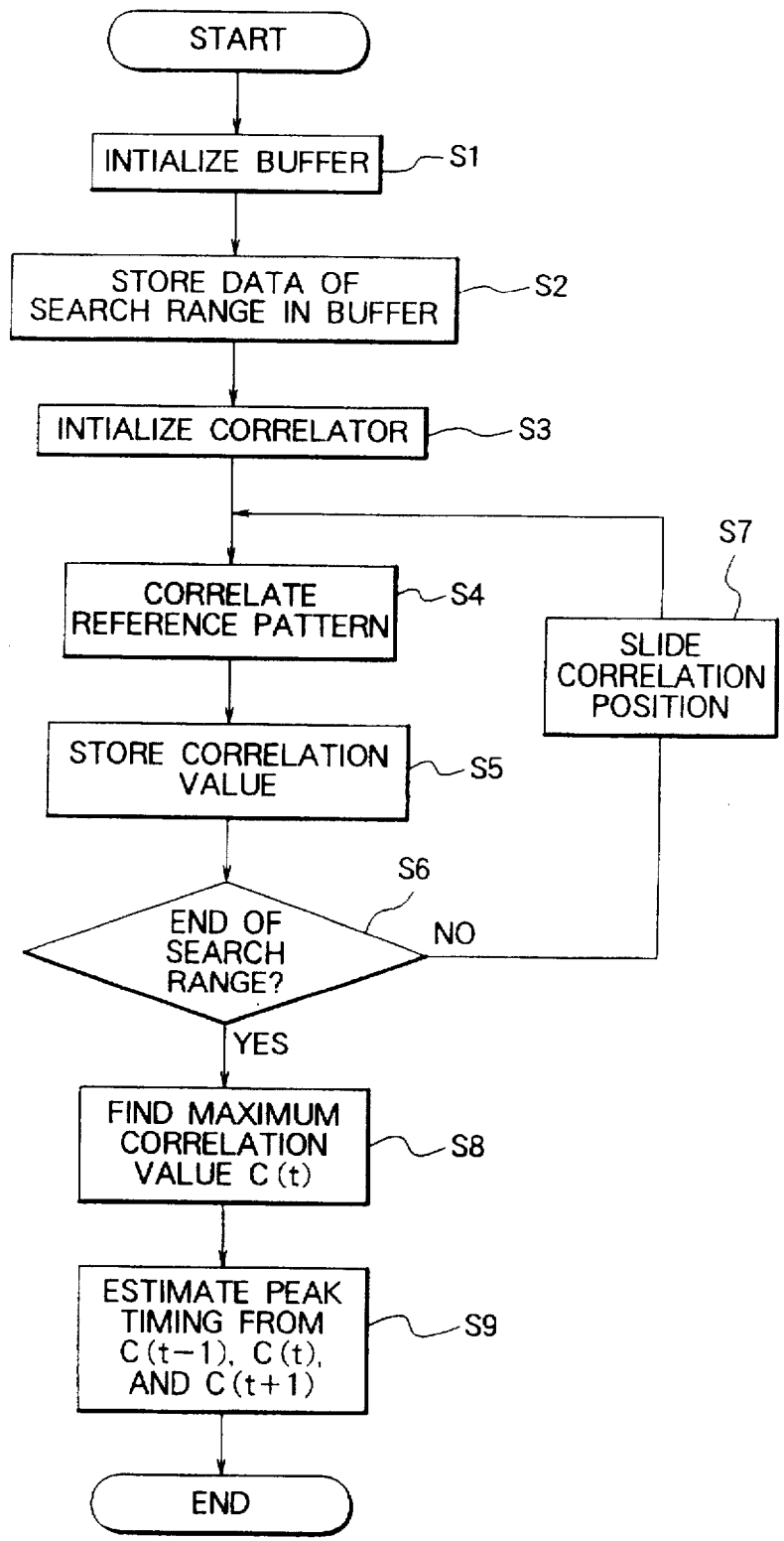
FIG. 4 is a flowchart illustrating the operation of the embodiment in FIG. 2.

Referring to the flowchart in FIG. 4, upon receiving a search signal, the control unit 2 initializes the buffer 3 (step S1). This initialization is performed by setting an initial address, for example, or a pointer to an initial address. The buffer 3 then stores samples values, starting from the initial address, and continuing over a search range within which the peak correlation timing is expected to exist (step S2).

The control unit 2 also initializes the correlator 4 (step S3). In this step the control unit 2 supplies a reference pattern Φ, and commands the correlator 4 to correlate the reference pattern with the sample values in the search range.

If the reference pattern Φ consists of N values {φ(1), . . . , φ(N)}, and if timing n is the first sample timing in the search range, then the correlator 4 begins by calculating the correlation C(n) at timing n according to the following equation (step S4):

$$C(n) = \sum_{i=1}^{N} \phi(i) y^*(n+i-1)$$

The asterisk indicates the complex conjugate. If the sample values are real numbers, then y*(n+i−1) is identical to y(n+i−1).

The values of the timing n and correlation C(n) are stored in the correlation comparator 6 in the comparator-estimator 5 (step S5). A decision is then made as to whether the end of the search range has been reached (step S6). If not, the timing value n is incremented by one, thereby sliding the correlation position forward by one sample timing (step S7), and the process returns to step S4 to perform another correlation.

The loop formed by steps S4 to S7 continues until correlation values C(n), C(n+1), . . . have been obtained for all positions in the search range. From among the correlation values found in the search range, the correlation comparator 6 selects a maximum correlation value C(t) (step S8). The timing t at which this maximum correlation value was produced will be referred to as the maximum correlation timing. The maximum correlation value C(t) and the correlation values C(t−1) and C(t+1) produced at the preceding and following timings are stored in registers 7, 8, and 9.

From the three stored correlation values C(t−1), C(t), and C(t+1), the threshold comparator and timing estimator 10 proceeds to estimate the peak timing P as follows (step S9).

First, the preceding correlation value C(t−1) and following correlation value C(t+1) are compared with the magnitude threshold θ. If C(t−1) and C(t+1) both exceed θ, or both fail to exceed θ, the threshold comparator and timing estimator 10 outputs the maximum correlation timing t as the estimated peak correlation timing P.

Figure 5:
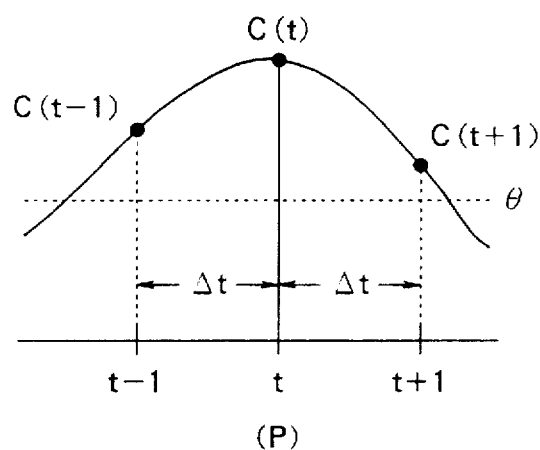
FIGS. 5, 6, 7, 8, 9, and 10 illustrate correlation curves, with correlation values taken at three timings on each curve.

FIG. 5 shows a case in which C(t−1) and C(t+1) both exceed the magnitude threshold θ. The maximum correlation value C(t) then necessarily exceeds θ, and the maximum correlation timing t output as the estimated peak correlation timing P is close to the true peak timing on the correlation curve.

Figure 6:
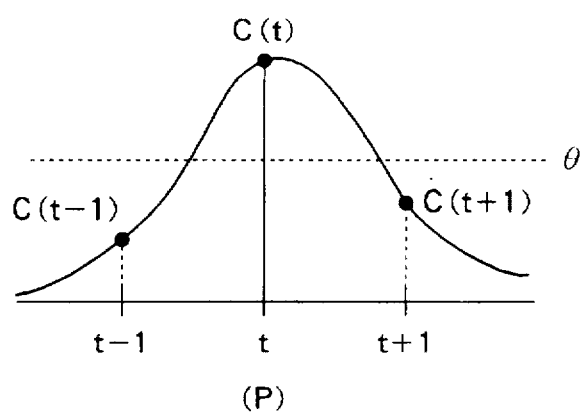

FIG. 6 shows a case in which C(t−1) and C(t+1) both fail to exceed the magnitude threshold θ, but the maximum correlation value C(t) exceeds θ. The maximum correlation timing t is again output as the estimated peak correlation timing P, and is again close to the true peak timing on the correlation curve.

Figure 7:
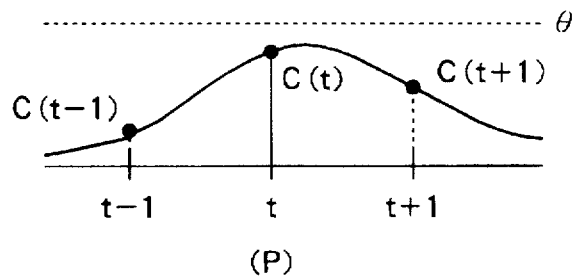

FIG. 7 shows a case in which, due to weak signal strength or noise, C(t−1), C(t), and C(t+1) all fail to exceed the magnitude threshold θ. High accuracy is not to be expected in this case, but the timing t output as the peak correlation timing P is still closer to the true peak timing than are the preceding and following timings t−1 and t+1.

If the preceding correlation value C(t−1) and following correlation value C(t+1) are disposed on opposite sides of the magnitude threshold θ, that is, if one of these two values C(t−1) and C(t+1) exceeds θ while the other fails to exceed θ, the threshold comparator and timing estimator 10 takes the difference D between the value exceeding θ and the maximum correlation value C(t), which also exceeds θ. This difference D is compared with the difference threshold δ.

As the estimated peak correlation timing P, the threshold comparator and timing estimator 10 now outputs a timing intermediate between the two timings (t−1 and t, or t and t+1) that produced correlation values exceeding the magnitude threshold θ. If the difference D fails to exceed the difference threshold δ, the estimated peak correlation timing P differs from the maximum correlation timing t by Δt/2, or one-half the length of the interval between samples. If D exceeds δ, then P differs from t by an amount αΔt, where α is a constant greater than zero but less than one-half.

Figure 8:
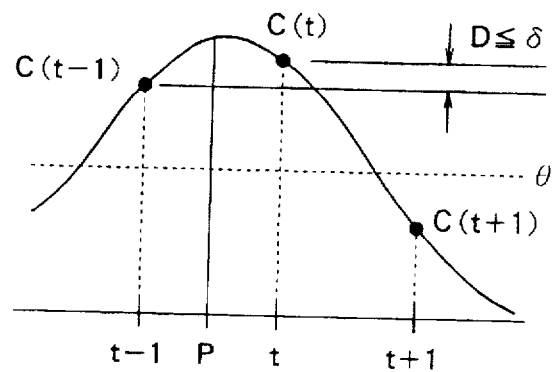

FIG. 8 shows a case in which the preceding correlation value C(t−1) exceeds θ, the following correlation value C(t+1) fails to exceed θ, and the difference D between C(t−1) and C(t) does not exceed the difference threshold δ. The estimated peak correlation timing P is t−½(i.e., t−Δt/2), disposed halfway between timings t and t−1, close to the true peak timing.

Figure 9:
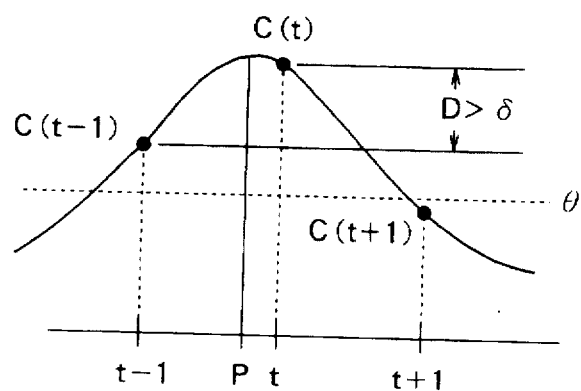

FIG. 9 shows a case in which C(t−1) exceeds θ, C(t+1) fails to exceed θ, and the difference D between C(t−1) and C(t) exceeds the difference threshold δ. If α is equal to one-fourth, the estimated peak correlation timing P is t−¼ (i.e., t−Δt/4), which is again close to the true peak correlation timing.

Figure 10:
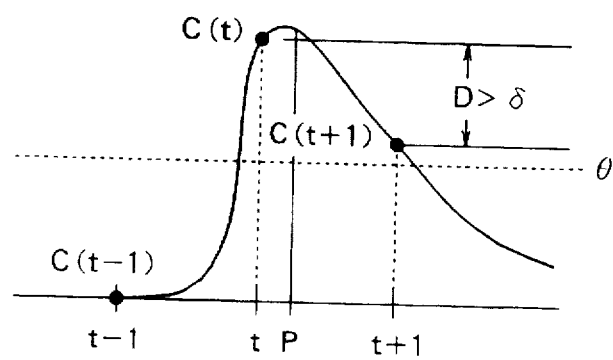

FIG. 10 shows a case in which the correlation curve is asymmetric, and C(t+1) exceeds θ while C(t−1) is zero. The difference D between C(t) and C(t+1) exceeds δ, so the estimated peak correlation timing P is t+¼(i.e., t+Δt/4), disposed one-fourth of the way from the maximum correlation timing t to the following timing t+1, once again close to the true peak correlation timing.

The invention can thus increase the precision of the peak correlation timing by a factor of four, for example, without requiring any increase in the sampling rate of the A/D converter 1.

Figure 11:
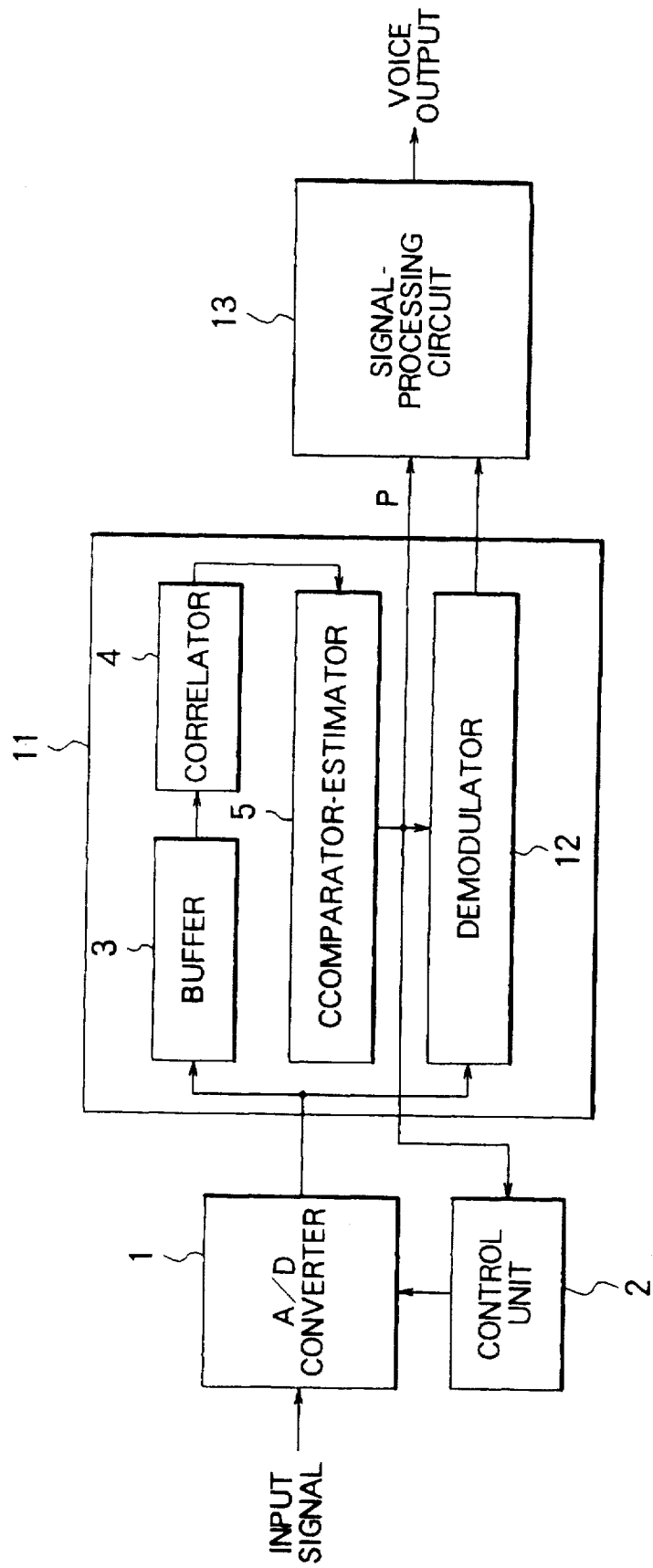
FIG. 11 is a block diagram of an embodiment of the invented receiving apparatus.

FIG. 11 is a block diagram of a receiving apparatus embodying the present invention, using the same reference numerals as in FIG. 2 for common elements. Designed for use in a TDMA cellular telephone system, this receiving apparatus has an A/D converter 1 and control unit 2, which are generally as described above. The sample stream output by the A/D converter 1 is supplied to a demodulation and timing recovery circuit 11 comprising the above-described buffer 3, correlator 4, and comparator-estimator 5, and a demodulator 12. A signal-processing circuit 13 receives timing information P from the comparator-estimator 5 and data from the demodulator 12, and outputs a voice signal.

The input signal received by this receiving apparatus is modulated by, for example, a π/4-shift differential quadrature phase-shift keying (QPSK) system, in which each phase shift represents a two-bit symbol, and has the frame structure that was illustrated in FIG. 1. After A/D conversion, the digitized input signal is supplied to the demodulator 12 and demodulated to obtain the symbol values. The symbol values constitute synchronization patterns and data as shown in FIG. 1. The data represent a coded voice signal, which the signal-processing circuit 13 decodes to generate the output voice signal.

The digitized input signal is also supplied to the buffer 3, and processed by the correlator 4 and comparator-estimator 5 as already described. The reference pattern supplied to the correlator 4 is, for example, a pattern matching the first synchronization pattern (SYNC 1) in FIG. 1. The estimated peak correlation timing P output by the comparator-estimator 5 is supplied to the control unit 2, demodulator 12, and signal-processing circuit 13.

The control unit 2 uses the estimated timing P to adjust the phase of the sampling clock signal supplied to the A/D converter 1, so that the A/D converter 1 samples the input signal at the estimated peak correlation timing. This ensures that the input signal is sampled at substantially the center of each symbol interval.

The demodulator 12 uses the estimated timing P for symbol synchronization. The signal-processing circuit 13 uses the estimated timing P for frame synchronization. The demodulator 12 and signal-processing circuit 13 thus use the same timing information P for synchronization of different data units (symbols and frames).

Due to the improved precision of the estimated timing P, the invented receiving apparatus can achieve the necessary symbol and frame synchronization accuracy with a slower A/D converter than required in conventional receiving apparatus. One resulting advantage is reduced cost. Other advantages include lighter weight and smaller size, because of reduced heat sinking requirements. A further advantage is reduced power consumption, leading to longer battery life if the apparatus is battery-powered.

Applications of the present invention are of course not restricted to TDMA cellular telephone systems. The invention can be applied to CDMA cellular systems, or more generally to any system that must recover a peak correlation timing from a received signal. Among the various types of timing recovery circuits to which the invention is relevant are frame synchronization circuits, phase synchronization circuits, timing detection circuits, bit synchronization circuits, and symbol synchronization circuits, to name just a few. The estimated timing P can be employed by any type of signal-processing circuit for synchronization of any data units (bits, symbols, frames, or other units).

The invention is not restricted to estimation of the peak correlation timing from only three correlation values C(t−1), C(t), and C(t+1) and two thresholds θ and δ. The precision of the estimate can be further refined by the use of additional correlation values and thresholds.

Those skilled in the art will recognize that other variations are possible within the scope claimed below.

What is claimed is:

1. A timing recovery circuit for estimating a timing P producing a peak correlation between an input signal and a reference pattern, comprising:

a sampling means for sampling said input signal at sample timings mutually separated by intervals of a certain length Δt, thereby generating a sample stream;

a correlating means coupled to said sampling means, for correlating said reference pattern with said sample stream at different timings, thus producing a plurality of correlation values; and a comparing and estimating means coupled to said correlating means, for comparing the correlation values produced by said correlating means at timings in a certain search range, and thereby estimating said timing P with a precision exceeding said length Δt.

2. The timing recovery circuit of claim 1, wherein said comparing and estimating means selects from among the correlation values output in said search range a maximum value and a plurality of preceding and following values, said maximum value and said preceding and following values having been produced by correlations at consecutive timings, and compares the preceding and following values thus selected with a magnitude threshold.

3. The timing recovery circuit of claim 2, wherein said comparing and estimating means selects just one preceding value and just one following value.

4. The timing recovery circuit of claim 2 wherein, if a first value among said preceding and following values exceeds said magnitude threshold, and a second value among said preceding and following values does not exceed said magnitude threshold, said comparing and estimating means compares a difference between said first value and said maximum value with a difference threshold, and estimates, as said timing P, a timing intermediate between the timings at which said maximum value and said first value were produced, responsive to a relation between said difference and said difference threshold.

5. The timing recovery circuit of claim 4 wherein, if said difference does not exceed said difference threshold, said comparing and estimating means estimates, as said timing P, a timing halfway between the timings at which said maximum value and said first value were produced.

6. The timing recovery circuit of claim 4 wherein, if said difference exceeds said difference threshold, said comparing and estimating means estimates, as said timing P, a timing intermediate between the timings at which said maximum value and said first value were produced, and less than half of said length Δt from the timing at which said maximum value was produced.

7. The timing recovery circuit of claim 1, further comprising a control means for adjusting said sample timings so that said sampling means samples said input signal at the timing P estimated by said comparing and estimating means.

8. A receiving apparatus for receiving and processing an input signal, comprising:

a sampling means for sampling said input signal at sample timings separated by intervals of a certain length Δt, thereby generating a sample stream;

a correlating means coupled to said sampling means, for correlating said reference pattern with said sample stream at different timings, thus producing a plurality of correlation values;

a comparing and estimating means coupled to said correlating means, for comparing the correlation values produced by said correlating means at timings in a certain search range, and thereby estimating, with a precision exceeding said length Δt, a timing P that will produce a peak correlation value; and a signal-processing circuit coupled to said comparing and estimating means, for processing said sample stream in synchronization with said timing P.

9. The receiving circuit of claim 8, also comprising a control means coupled to said comparing and estimating means, for adjusting said sample timings so that said sampling means samples said input signal at said timing P.

10. The receiving circuit of claim 8, wherein said signal-processing circuit uses said timing P for frame synchronization.

11. The receiving circuit of claim 8, wherein said signal-processing circuit uses said timing P for symbol synchronization.

12. The receiving circuit of claim 8, wherein said signal-processing circuit uses said timing P for bit synchronization.

13. A method of estimating a timing P producing a peak correlation between an input signal and a reference pattern, comprising the steps of:

sampling said input signal at sample timings separated by intervals of a certain length Δt, thereby generating a sample stream;

correlating said reference pattern with said sample stream at different timings, thereby producing correlation values;

comparing the correlation values produced in a certain search range;

selecting a maximum correlation value from among the correlation values produced in said search range, and designating a timing at which said maximum correlation value was produced as a maximum correlation timing;

comparing a preceding correlation value, produced at a timing preceding said maximum correlation timing by said length Δt, with a magnitude threshold;

comparing a following correlation value, produced at a timing following said maximum correlation timing by said length Δt, with said magnitude threshold; and selecting, as said timing P, a timing removed from said maximum correlation timing by an amount exceeding zero but not exceeding half of said length Δt, if said preceding correlation value and said following correlation value are disposed on opposite sides of said magnitude threshold.

14. The method of claim 13, comprising the further step of selecting said maximum correlation timing as said timing P, if said preceding correlation value and said following correlation value are not disposed on opposite sides of said magnitude threshold.

15. The method of claim 13, comprising the further steps of:

taking a difference between said maximum correlation value and one value among said preceding correlation value and said following correlation value, if said preceding correlation value and said following correlation value are disposed on opposite sides of said magnitude threshold value and said one value exceeds said magnitude threshold; and comparing said difference with a difference threshold, wherein a timing removed from said maximum correlation timing by less than half of said length Δt is selected as said timing P, if said difference exceeds said difference threshold; and a timing removed from said maximum correlation timing by half of said length Δt is selected as said timing P, if said difference does not exceed said difference threshold.

16. The method of claim 13, comprising the further step of using said timing P for frame synchronization of said input signal.

17. The method of claim 13, comprising the further step of using said timing P for symbol synchronization of said input signal.

18. The method of claim 13, comprising the further step of using said timing P for bit synchronization of said input signal.

19. The method of claim 13, comprising the further step of adjusting said sample timings so that said input signal is sampled at said timing P.

* * * * *